United States Patent
Brizius

(10) Patent No.: US 9,598,452 B2
(45) Date of Patent: Mar. 21, 2017

(54) CELLULOSE HYDROLYSIS VIA MODIFIED LIGNOSULFONATE CATALYSTS

(71) Applicant: EMPIRE TECHNOLOGY DEVELOPMENT LLC, Wilmington, DE (US)

(72) Inventor: Glen Leon Brizius, Augusta, GA (US)

(73) Assignee: Empire Technology Development LLC, Wilmington, DE (US)

( * ) Notice: Subject to any disclaimer, the term of this patent is extended or adjusted under 35 U.S.C. 154(b) by 68 days.

(21) Appl. No.: 14/394,827

(22) PCT Filed: Feb. 27, 2013

(86) PCT No.: PCT/US2013/027934
§ 371 (c)(1),
(2) Date: Oct. 16, 2014

(87) PCT Pub. No.: WO2013/158219
PCT Pub. Date: Oct. 24, 2013

(65) Prior Publication Data
US 2015/0099867 A1    Apr. 9, 2015

Related U.S. Application Data

(66) Substitute for application No. 61/636,035, filed on Apr. 20, 2012.

(51) Int. Cl.
| | | |
|---|---|---|
| C08B 5/00 | (2006.01) |
| C07G 1/00 | (2011.01) |
| C08B 15/00 | (2006.01) |
| C08B 31/06 | (2006.01) |
| C08B 37/00 | (2006.01) |
| C08H 7/00 | (2011.01) |
| C08H 8/00 | (2010.01) |
| C08L 1/02 | (2006.01) |
| C08L 3/02 | (2006.01) |
| C08L 5/14 | (2006.01) |
| C08L 97/00 | (2006.01) |
| C08L 97/02 | (2006.01) |

(52) U.S. Cl.
CPC ............... *C07G 1/00* (2013.01); *C08B 5/00* (2013.01); *C08B 15/00* (2013.01); *C08B 31/06* (2013.01); *C08B 37/0057* (2013.01); *C08H 6/00* (2013.01); *C08H 8/00* (2013.01); *C08L 1/02* (2013.01); *C08L 3/02* (2013.01); *C08L 5/14* (2013.01); *C08L 97/005* (2013.01); *C08L 97/02* (2013.01)

(58) Field of Classification Search
CPC .... C07G 1/00; C08H 6/00; C08H 8/00; C08B 5/00
See application file for complete search history.

(56) References Cited

U.S. PATENT DOCUMENTS

| | | | | |
|---|---|---|---|---|
| 2008/0146701 A1* | 6/2008 | Sain | ....................... | B82Y 30/00 524/9 |
| 2009/0186958 A1* | 7/2009 | St. Clair | ................... | C08F 8/14 522/39 |
| 2010/0012756 A1* | 1/2010 | Medoff | ..................... | C08H 8/00 241/23 |
| 2011/0030587 A1* | 2/2011 | Reknes | ................... | C04B 24/18 106/725 |

FOREIGN PATENT DOCUMENTS

WO    WO2009080894 A1    7/2009

OTHER PUBLICATIONS

Zubrick, J. W., "The Organic Chem Lab Survival Manual," John Wiley & Sons, Inc, 1988, pp. 98-100.*
Kramer, G. N., et al. "The production of powdered candidate biological and environmental reference materials in the laboratories of the Joint Research Centre," Fresenius J Anal Chem (1998) 360 : 299-303.*
Lebo, "Lignin," Kirk-Othmer Encyclopedia of Chemical Technology, published online 2001, vol. 15, 32 pages.*
CryoMill, product information, http://www.retsch.com/products/milling/mixer-mills/cryomill/, archived via WaybackMachine, Dec. 18, 2010.*
International Search Report and Written Opinion for PCT/US2012/027934 dated May 3, 2013.
69th Meeting, Joint FAO/WHO Expert Committee on Food Additives, Rome, Italy; Jun. 17-26, 2008, pp. 1-21.
Biofuels Basics, Learning About Renewable Energy, Mar. 21, 2012; accessed at http://web.archive.org/web/20120411114935/http://www.nrel.gov/learning/re_biofuels.html.
Bringezu et al., Towards Sustainable production and use of resources: Assessing Biofuels, UNEP, pp. 1-120 (2009).
Budny et al., Brazil Institute Special Report, The Global Dynamics of Biofuels, Issue 3, pp. 1-8, Apr. 2007.
Carbon Black Dispersion, Dialogue/Newsletters, accessed at http://archive.today/BFSiv, vol. 12, No. 1, Lignin Institute, pp. 1-2 (Mar. 2003).
Clark,. Solid Acids for Green Chemistry, *Accounts on Chemical Research* (2002), 35:791-797.
Determination of the surface area by the BET method, accessed at http://zumbuhllab.unibas.ch/pdf/talks/080425_Tobias_BET.pdf, accessed on Jul. 23, 2014, pp. 1-19.
Dyes (lignosulfonates as dispersants), accessed at http://archive.today/0gxHa, Dialogue/Newsletters, vol. 11, No. 1, Lignin Institute, pp. 1-2 (Mar. 2002).
Ethanol fuel in Brazil, accessed at http://web.archive.org/web/20120128183732/http://en.wikipedia.org/wiki/Ethanol_fuel_in_Brazil, last modified on Jan. 16, 2012, pp. 1-23.
Faith, Development of the Scholler Process in the United States, *Ind. Eng. Chem.* (1945), 37(1):9-11.
Freshwater Spills Symposia, U.S. Environmental Protection Agency, accessed at http://web.archive.org/web/20120309143353/http://www.epa.gov/emergencies/content/fss/index.htm, accessed on Jul. 23, 2014, p. 1.

(Continued)

Primary Examiner — Liam J Heincer
Assistant Examiner — Nicholas Hill
(74) Attorney, Agent, or Firm — Pepper Hamilton LLP

(57) ABSTRACT

Biopolymer catalysts, methods of synthesizing a biopolymer catalyst, and methods of catalyzing the hydrolysis of cellulose with a biopolymer catalyst are described.

17 Claims, No Drawings

(56) References Cited

OTHER PUBLICATIONS

Fukuoka, Catalytic Conversion of Cellulose into Sugar Alcohols, *Angewandte Chemie International Edition*, 45(31):5161-5163 (2006).

Guevarra, JCI's Global Study Finds Rising Energy Costs Drive Green Growth, accessed at http ://web.archive.org/web/20120216140750/http://www.greenbiz.com/news/2011/06/16/jci-global-study-finds-rising-energy-costs-drive-green-growth, GreenBiz.com, Jun. 16, 2011, pp. 1-2.

Hahn-Hagerdal, Bio-ethanol—the fuel of tomorrow from the residues of today, *Trends in Biotechnology*, 24(12):549-556 (2006).

Hara et al., A Carbon Material as a Strong Protonic Acid, *Angewandte Chemie, International Edition*, 43:2955-2958 (2004).

Harris et al., Madison Wood Sugar Process, *Ind. Eng. Chem.*, 38:890-895 (1946).

Holladay et al., Top Value Added Chemicals from Biomass vol. II—Results of Screening for Potential Candidates from Biorefinery Lignin, DOE (PNNL, NREL), University of Tennessee, pp. 1-87 (Oct. 2007).

Jena et al., A Novel Technique for Surface Area and Particle Size Determination of Components of Fuel Cells and Batteries, accessed at http://www.pmiapp.com/publications/docs/A_Novel_technique_for_surface_area.pdf, accessed on Jul. 23, 2014, pp. 1-3.

Lignins—Products With Many Uses, accessed at http://web.archive.org/web/20071009004745/http://www.lignin org/whatis.html, accessed on Jul. 23, 2014, pp. 1-2.

Lignins: A Safe Solution for Roads, Dialogue/Newsletters, vol. 1, No. 3. Lignin Institute, pp. 1-2 (Jul. 1992).

Mancosky et al., The effects of lignocellulosic fiber surface area on the dynamics of lignin oxidation and diffusion, *J. Appl. Polym. Sci.*, 94(1):177-181 (2004).

Oil-Price.net, Crude Oil and Commodity Prices, accessed at http://web.archive.org/web/20120417233828/http://www.oil-price.net/, Apr. 17, 2012, pp. 1-3.

Okamura et al., Acid-Catalyzed Reactions on Flexible Polycyclic Aromatic Carbon in Amorphous Carbon, *Chemistry of Materials*, 18(13): 3039-3045 (Jun. 3, 2006).

Okuhara, Water-Tolerant Solid Acid Catalysts, *Chemical Reviews*, (Sep. 7, 2002), 102(10): 3641-3666.

Peak Oil, ASPO International, accessed at http://web.archive.org/web/20120414190709/http://www.peakoil.net/, accessed on Jul. 23, 2014, pp. 1-3.

Perlac et al., Biomass as Feedstock for a Bioenergy and Bioproducts Industry: The Technical Feasibility of a Billion-Ton Annual Supply, DOE & USDA, pp. 1-78 (Apr. 2005).

Hurd, Pyrolysis Chemistry, accessed at http://web.archive.org/web/20091128063528/http://blogs.princeton.edu/chm333/f2006/biomass/2007/01/pyrolysis_chemistry.html, Jan. 9, 2007, pp. 1-4.

Ragauskas et al., The Path Forward for Biofuels and Biomaterials, *Science*, 311:484-489 (Jan. 27, 2006).

Sasaki et al., Dissolution and Hydrolysis of Cellulose in Subcritical and Supercritical Water, *Ind. Eng. Chem. Res.*, 39:2883-2890 (Aug. 7, 2000).

Sherrard et al., Review of Processes in the United States Prior to World War II, *Ind. Eng. Chem.*, 37(1):5-8 (Jan. 1945).

Smith et al., Acetylation of aromatic ethers using acetic anhydride over solid acid catalysts in a solvent-free system. Scope of the reaction for substituted ethers, *Organic & Biomolecular Chemistry*, 1:1560-1564 (Mar. 27, 2003).

Suganuma et al., Hydrolysis of Cellulose by Amorphous Carbon Bearing SO3H, COOH, and OH Groups, *J. Am. Chem. Soc.*, 130:12787-12793 (Aug. 29, 2008).

Techno-economical and environmental evaluation of lignocellulosic biorefineries, Bioenergy and Energy Planning Research Group, accessed at http://web.archive.org/web/20121215181400/http://bpe.epfl.ch/page-34016-en.html, (Sep. 28, 2010), pp. 1-3.

Thielemans et al., Lignin Esters for Use in Unsaturated Thermosets: Lignin Modification and Solubility Modeling, *Biomacromolecules*, 6(4):1895-1905 (Jun. 7, 2005).

Toledo, et al., Calcium Lignosulfonate (40-65), Chemical and Technical Assessment, pp. 1-8 (2008).

Valley, A Study of the Alcoholysis of Cellulose, PhD dissertation, *The Institute of Paper Chemistry*, pp. 1-122 (Jun. 1955).

Zhang et al., Toward an Aggregated Understanding of Enzymatic Hydrolysis of Cellulose: Noncomplexed Cellulase Systems, *Biotechnology and Bioengineering*, 88(7):797-824 (Nov. 10, 2004).

\* cited by examiner

CELLULOSE HYDROLYSIS VIA MODIFIED LIGNOSULFONATE CATALYSTS

CLAIM OF PRIORITY

This application is a U.S. national stage filing under 35 U.S.C. §371 of International Application No. PCT/US2013/27934, filed Feb. 27, 2013 and entitled "CELLULOSE HYDROLYSIS VIA MODIFIED LIGNOSULFONATE CATALYSTS," which claims priority to U.S. Provisional Patent Application No. 61/636,035, filed Apr. 20, 2012, the disclosure of each is incorporated by reference in their entirety.

CROSS REFERENCE

This application claims the benefit of U.S. Provisional Application Ser. No. 61/636,035, filed Apr. 20, 2012 which is incorporated herein by reference in its entirety.

FIELD

This disclosure relates to a biopolymer catalyst, methods of synthesizing a biopolymer catalyst, and methods of catalyzing the hydrolysis of cellulose with a biopolymer catalyst.

BACKGROUND

Cellulose is a key component of grasses and agricultural and wood waste, and the conversion of such vegetable matter into useful sugars or saccharides represent an important means of producing cellulosic ethanol fuel and a wide range of industrially applicable chemicals.

Cellulose is an abundant water-insoluble source of sugars as it is a long-chain polymer of glucose linked by $\alpha$-1,4-glycosidic bonds and hydrolysis of these bonds releases smaller polymeric sugar fragments, with complete cleavage yielding glucose monomers. This conversion of plant matter into useful sugars is currently of very high interest as it not only produces cellulosic ethanol fuel, but can also provide a wide range of industrially important chemicals including ethanol, hydrocarbons and the starting materials for polymers.

Current methods for the efficient hydrolysis of cellulose to glucose and glucose oligomers are inefficient, wasteful and require the use of toxic catalysts. They commonly involve the use of Brønsted acid catalysts such as sulfuric acid. Recovery of acid catalysts such as sulfuric acid from the cellulose hydrolysis waste stream is both difficult and costly. These methods are also economically counterproductive. Accordingly, more and better ways of hydrolyzing cellulose in an economically and environmentally sustainable way are desirable.

SUMMARY

Embodiments herein disclose environmentally and economically sustainable biopolymer catalysts for the hydrolysis of cellulose, methods for synthesizing biopolymer catalysts and methods for catalyzing the hydrolysis of cellulose using biopolymer catalysts.

In some embodiments, biopolymer catalysts comprise a sulfonated biopolymer.

In yet other embodiments, a biopolymer catalyst comprises a microcrystalline sulfonated biopolymer comprising a plurality of pendent acid groups, a plurality of pendent phenolic alcohol groups, and a plurality of pendent sulfonated groups.

Some embodiments are directed to a method of synthesizing a biopolymer catalyst. In some embodiments, synthesis of a biopolymer catalyst comprises sulfonating a biopolymer to form a sulfonated biopolymer.

Some embodiments are directed to a method of extracting a purified sulfonated biopolymer from sulfite wood pulp.

Some embodiments are directed to a method of catalyzing the hydrolysis of cellulose. In some embodiments, catalyzing the hydrolysis of cellulose comprises combining cellulose with a biopolymer catalyst to form glucose, glucose oligomers, or combinations thereof.

In some embodiments, the characteristics of the biopolymer catalyst allow for the efficient extraction of the products of cellulose hydrolysis and for the biopolymer catalyst to be reused.

DETAILED DESCRIPTION

Embodiments herein disclose environmentally and economically sustainable biopolymer catalysts for the hydrolysis of cellulose, methods for synthesizing biopolymer catalysts and methods for catalyzing the hydrolysis of cellulose using biopolymer catalysts.

Embodiments disclosed herein are directed to biopolymer catalysts. Some embodiments are directed to biopolymer catalysts comprising: a microcrystalline sulfonated biopolymer comprising a plurality of pendent acid groups, a plurality of pendent phenolic alcohol groups, and a plurality of pendent sulfonate groups. Some embodiments are directed to biopolymer catalysts comprising: a microcrystalline sulfonated biopolymer comprising a plurality of pendent acid groups of formula —COOH, a plurality of pendent phenolic alcohol groups of formula —OH, and a plurality of pendent sulfonated groups of formula —SO$_2$OH.

In some embodiments, the biopolymer catalyst is environmentally and economically sustainable for use in the catalysis of the hydrolysis of cellulose to form glucose or glucose oligomers. In some embodiments, the biopolymer catalyst can be easily reused or recycled and used in multiple cellulose hydrolysis reactions. The biopolymer catalysts described herein can be synthesized from inexpensive starting materials that are readily available. In some embodiments, the biopolymers can be obtained from the waste stream of the paper industry as described below. In some embodiments, the use of biopolymer catalysts in the hydrolysis of cellulose allows the user to minimize or eliminate the need for toxic catalysts such as sulphuric acid thereby making it environmentally benign.

Certain embodiments are directed to a method of synthesizing a microcrystalline biopolymer catalyst, the method comprising: sulfonating a biopolymer to form a sulfonated biopolymer, freezing the sulfonated biopolymer in liquid nitrogen; and grinding the sulfonated biopolymer into a microcrystalline powder to form a microcrystalline biopolymer catalyst.

As used herein, a "biopolymer" is intended to mean a polymer that is derived from a living organism and made up of identical or diverse monomer units bound together. In some embodiments, the biopolymer can be extracted from a natural source. In some embodiments, the biopolymer is lignin, cellulose, hemicellulose, dextrin, a wood-derived biopolymer, or a combination thereof. In further embodiments, the biopolymer is lignin. In some embodiments, a biopolymer comprises a plurality of pendent phenolic alcohol groups, a plurality of pendent carboxylic acid groups, a plurality of pendent methoxy groups, or a combination thereof.

The biofuel and paper industries produce large amounts of biomass waste in the form of five and six carbon sugars as well as vast amounts of waste products such as lignin. Lignin is a highly cross-linked, heavily aromatic, polymeric product that has little value to these industries, and as such is treated as a waste material. In some embodiments, lignin represents an inexpensive biopolymer that is rich with functional groups made up of phenols and primary and secondary alcohols, as seen in the exemplary generic lignin structure below:

fonated biopolymer. In some embodiments, the biopolymer is in microcrystalline form prior to the sulfonation step. In some embodiments, "microcrystalline" is intended to mean a material comprising crystals visible only under magnification under a light microscope. In some embodiments, these crystals are 20-30 microns in size. In some embodiments, a microcrystalline form can be achieved by manual grinding of the biopolymer prior to the sulfonation step. In some embodiments, a microcrystalline form can be achieved by freezing a biopolymer in liquid nitrogen followed by mechanically grinding the biopolymer as it returns to ambient temperature.

In some embodiments, the microcrystalline biopolymer is dissolved in sulfurous acid to obtain carbocation interme-

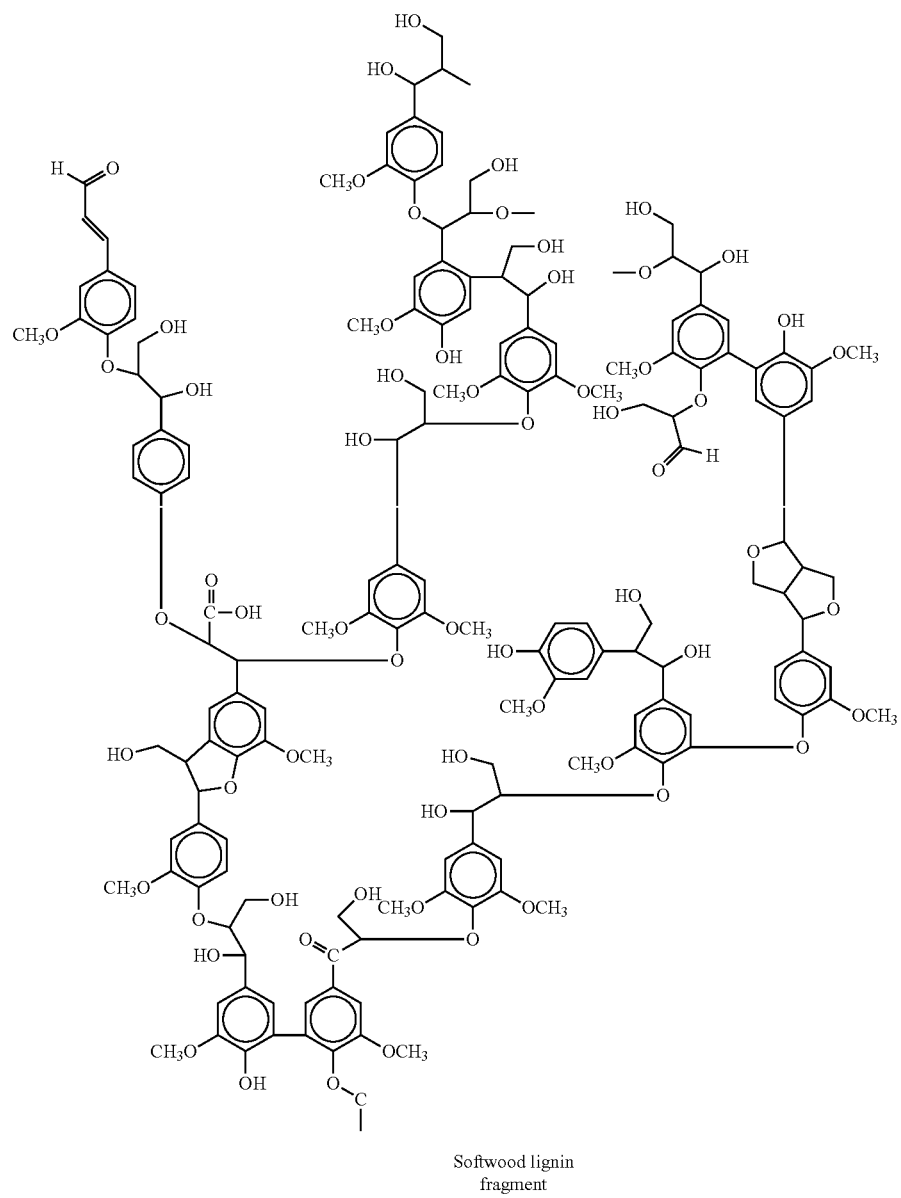

Softwood lignin fragment

In some embodiments, the sulfonating step comprises treating the biopolymer with an acid source to form a carbocation intermediate followed by a step of treating the carbocation intermediate with bisulfite ions to form a suldiates for a period of time of about 2 hours to about 20 hours. In some embodiments, the microcrystalline biopolymer is dissolved in sulfurous acid to obtain carbocation intermediates at a temperature of about 100° C. to about 200° C. In some embodiments, the microcrystalline biopolymer is dissolved in a salt of sulfurous acid. In some embodiments, the salt of sulfurous acid comprises sulfites, bisulfites, or a combination thereof. In some embodiments, the counter ion can be sodium, calcium, potassium, magnesium or ammonium. In some embodiments, the salt is sodium sulfide. In some embodiments, the microcrystalline biopolymer is dissolved in salt of sulfurous acid to obtain carbocation intermediates for a period of time of about 2 hours to about 20 hours. In some embodiments, the microcrystalline biopolymer is dissolved in salt of sulfurous acid to obtain carbocation intermediates at a temperature of about 100° C. to about 200° C. In some embodiments, carbocation intermediates may be obtained from the microcrystalline biopolymer via the Kraft Process.

In some embodiments, dissolving the microcrystalline biopolymer in sulfurous acid to obtain carbocation intermediates is carried out at a temperature of about 100° C. to about 200° C. In some embodiments, dissolving the microcrystalline biopolymer in sulfurous acid to obtain carbocation intermediates is carried out at a temperature of about 100° C. to about 110° C., about 100° C. to about 120° C., about 100° C. to about 130° C., about 100° C. to about 140° C., about 100° C. to about 150° C., about 100° C. to about 160° C., about 100° C. to about 170° C., about 100° C. to about 180° C., or about 100° C. to about 190° C. In some embodiments, dissolving the microcrystalline biopolymer in sulfurous acid to obtain carbocation intermediates is carried out at a temperature of about 100° C. to about 120° C., about 120° C. to about 130° C., about 130° C. to about 140° C., about 140° C. to about 150° C., about 150° C. to about 160° C., about 160° C. to about 170° C., about 170° C. to about 180° C., about 180° C. to about 190° C., or about 190° C. to about 200° C.

In some embodiments, the sulfonation step comprises treating the biopolymer with an acid source. In some embodiments, the acid source is sulfurous acid. In some embodiments, the sulfonation step is carried out at a temperature of about 100° C. to about 200° C.

In some embodiments, treatment of a microcrystalline biopolymer with the acid source results in the formation of biopolymer fragments. For example, in embodiments where the microcrystalline biopolymer is lignin, treatment with an acid source such as sulphuric acid results in the cleavage of some of the aromatic ether bonds found on the lignin to form carbocation intermediates as shown below wherein R is selected from —H —OH, and —CH$_3$ or another sulfonated lignin subunit as shown below:

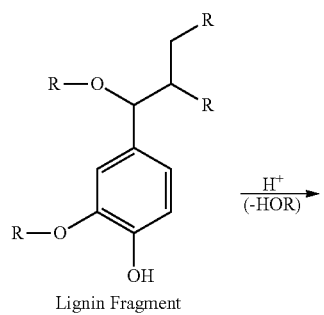

Lignin Fragment

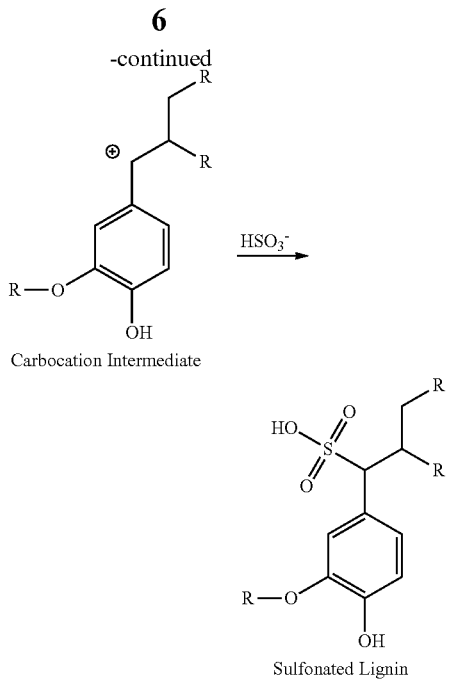

Carbocation Intermediate

Sulfonated Lignin

The structures in the reaction scheme shown above are intended to represent in some embodiments, a complete lignin molecule. In yet other embodiments, the structures in the reaction scheme shown above are intended to represent portions of larger lignin molecules. In some embodiments, the carbocation intermediate is then reacted with a bisulfite ion such as hydrogen sulfite, the conjugate base of sulfurous acid. In some embodiments, the result is the formation of a sulfonated biopolymer fragment. In some embodiments, the result is the formation of sulfonate groups on the lignin fragment to give sulfonated lignin. Under the conditions described above, the formation of sulfonate groups or sulfonation occurs solely on the side chains and not on the aromatic rings of the lignin fragment.

In some embodiments, reacting the microcrystalline biopolymer with a bisulfite ion to obtain carbocation intermediates is carried out at a temperature of about 100° C. to about 200° C. In some embodiments, reacting the microcrystalline biopolymer with a bisulfite ion to obtain carbocation intermediates is carried out at a temperature of about 100° C. to about 110° C., about 100° C. to about 120° C., about 100° C. to about 130° C., about 100° C. to about 140° C., about 100° C. to about 150° C., about 100° C. to about 160° C., about 100° C. to about 170° C., about 100° C. to about 180° C., or about 100° C. to about 190° C. In some embodiments, reacting the microcrystalline biopolymer with a bisulfite ion to obtain carbocation intermediates is carried out at a temperature of about 100° C. to about 120° C., about 120° C. to about 130° C., about 130° C. to about 140° C., about 140° C. to about 150° C., about 150° C. to about 160° C., about 160° C. to about 170° C., about 170° C. to about 180° C., about 180° C. to about 190° C., or about 190° C. to about 200° C.

In some embodiments, reacting the microcrystalline biopolymer with a bisulfite ion to obtain carbocation intermediates is carried out for about 2 hours to about 20 hours.

The reaction scheme for the sulfonation of lignin is presented for illustrative purposes and is not intended to limit the application of this method to other types of biopolymers including but not limited to cellulose, hemicellulose, dextrin, a wood-derived biopolymer, or a combination thereof. In some embodiments, a biopolymer fragment can be formed from any biopolymer containing aromatic ether bonds or any other bond subject to cleavage under acidic conditions. In some embodiments, a sulfonated biopolymer fragment can be formed from any biopolymer fragment comprising pendent phenolic alcohol groups, pendent carboxylic acid groups, or a combination thereof.

In some embodiments, the sulfonated biopolymer is extracted from the sulfonation reaction. In some embodiments, the sulfonated biopolymer is in solution. Some embodiments further comprise precipitating the sulfonated biopolymer as a salt after sulfonating the biopolymer. In some embodiments, the precipitating step comprises adding a hydroxide solution. In some embodiments, the hydroxide solution is calcium hydroxide, magnesium hydroxide, beryllium hydroxide, strontium hydroxide, radium hydroxide, barium hydroxide, or combinations thereof.

In some embodiments, the resulting precipitated sulfonated biopolymer salt is a calcium salt, a magnesium salt, a beryllium salt, a strontium salt, a radium salt, a barium salt, or combinations thereof. In yet other embodiments, the sulfonated biopolymer salt is a calcium salt and the hydroxide solution used to precipitate the salt is calcium hydroxide. In some embodiments, the salt formed corresponds to the type of hydroxide solution used. For example, precipitating the sulfonated biopolymer with calcium hydroxide will yield a sulfonated biopolymer calcium salt. In some embodiments, the biopolymer is precipitated at an alkaline pH. In some embodiments, the biopolymer is precipitated at a pH of about 9.5 to about 10.

Some embodiments further comprise adjusting the pH of the sulfonated biopolymer salt to form a sulfonated biopolymer in acidic form. In some embodiments, the pH of the sulfonated biopolymer salt is reduced to a low pH, such as about 0 to about 6. In some embodiments, the pH of the sulfonated biopolymer salt is reduced to a pH of about 0-6. In some embodiments, the pH of the sulfonated biopolymer salt is reduced to a pH of about 0. In some embodiments, the pH of the sulfonated biopolymer salt is reduced to a pH of about 1. In some embodiments, the pH of the sulfonated biopolymer salt is reduced to a pH of about 2. In some embodiments, the pH of the sulfonated biopolymer salt is reduced to a pH of about 3. In some embodiments, the pH of the sulfonated biopolymer salt is reduced to a pH of about 4. In some embodiments, the pH of the sulfonated biopolymer salt is reduced to a pH of about 5. In some embodiments, the pH of the sulfonated biopolymer salt is reduced to a pH of about 6. In some embodiments, reducing the pH results in formation of a sulfonated biopolymer salt in its free acid form. In some embodiments, the free acid form of the sulfonated biopolymer salt renders it insoluble in water.

In some embodiments, the step of adjusting the pH of the sulfonated biopolymer salt comprises adding a dilute mineral acid. In some embodiments, the dilute mineral acid is hydrochloric acid, nitric acid, phosphoric acid, sulfuric acid, boric acid, hydrofluoric acid, hydrobromic acid, perchloric acid, or combinations thereof.

In some embodiments, the resulting sulfonated biopolymer in acidic form comprises a sulfonated biopolymer with a plurality of pendent acid groups of formula —COOH, a plurality of pendent phenolic alcohol groups of formula —OH, a plurality of pendent sulfonate groups of formula —$SO_2OH$, or combinations thereof.

In some embodiments, the presence of the desired functional groups on the sulfonated biopolymer may be ascertained by scanning electron microscopy, powder X-ray diffraction, Raman spectroscopy, Fourier transform infrared spectroscopy, $^{13}C$ cross-polarization (CP) magic angle spinning nuclear magnetic resonance, $^{31}P$ MAS NMR, gas adsorption analysis, elemental analysis, cation-exchange analysis, and combinations thereof.

In some embodiments, NMR analysis of the sulfonated biopolymer allows for the determination of the relative equivalents of sulfonate groups, hydroxyl groups and carboxylic acid groups present in a particular batch of biopolymer.

In some embodiments, the degree of sulfonation can be determined by NMR analysis. Aliquots of the reaction can be taken and measured by $^{1}H$ NMR analysis because the sulfonate chain will not register a proton signal by $^{1}H$ NMR analysis and replace the hydroxyl signal therefore diminishing signals in the hydroxyl and carboxylic acid regions. In some embodiments, the percentage change in the hydroxyl and carboxylic acid regions is a surrogate for the degree of sulfonate groups present on the biopolymer. For example, in some embodiments, a 90% decrease in the signal signals in the hydroxyl and carboxylic acid regions is indicative that 90% of the hydroxyl and carboxylic acid side chains have been substituted with sulfonate side chains, leaving 10% of the hydroxyl and carboxylic acid side chains on the biopolymer.

In yet other embodiments, elemental analysis, $^{1}H$ NMR analysis which is modified to differentiate the carboxylic acid signals from the sulfonic acid protons, or combinations thereof can be used to determine the degree of sulfonation.

In some embodiments, the sulfonated biopolymer in acidic form may contain impurities from the sulfonation reaction, the precipitation, the pH adjustment, or combinations thereof. In some embodiments, the free acid form of the sulfonated biopolymer salt renders it insoluble in water allowing it to be washed in fresh water without loss of the sulfonated biopolymer salt. Some embodiments further comprise filtering the sulfonated biopolymer salt. Some embodiments further comprise washing the sulfonated biopolymer salt. In some embodiments, the sulfonated biopolymer is washed with fresh water. In some embodiments, filtering the sulfonated biopolymer salt may include filtration through a fine glass frit filter inserted into a filter funnel, wherein a reaction mixture containing the sulfonated biopolymer salt is poured onto the fine glass frit filter; followed by addition of fresh water to wash the sulfonated biopolymer salt that will be retained by the filter.

In some embodiments, the sulfonated biopolymer is allowed to air dry. In some embodiments, the sulfonated biopolymer is exposed to atmospheric air causing the solvents present to evaporate leaving behind a sulfonated biopolymer in solid form. In some embodiments, the sulfonated biopolymer is allowed to air dry for a period of time of about 1 to about 12 hours. In some embodiments, the sulfonated biopolymer is allowed to air dry for a period of time of about 1 to about 9 hours. In some embodiments, the sulfonated biopolymer is allowed to air dry for a period of time of about 1 to about 6 hours. In some embodiments, the sulfonated biopolymer is allowed to air dry for a period of time of about 1 to about 3 hours. In some embodiments, the sulfonated biopolymer is allowed to air dry at ambient temperature and pressure. In some embodiments, the sulfonated biopolymer can be spread onto an evaporating dish and placed in a drying oven at a temperature of about 30° C. to about 50° C.

In some embodiments, to form a microcrystalline powder, the solid sulfonated biopolymer may be frozen and mechanically ground into a microcrystalline powder.

In some embodiments, the sulfonated biopolymer in acidic form is frozen in liquid nitrogen. In some embodiments, the sulfonated biopolymer in acidic form can be frozen by subjecting to freezing temperatures. In some embodiments, the sulfonated biopolymer can be exposed to temperatures of about 0° C. to about −200° C. for a period of time suitable to freeze the sulfonated biopolymer. In some embodiments, the colder the temperature to which the sulfonated biopolymer is exposed, the faster it will freeze. As used herein, the term "freeze" is intended to mean a lowering of the temperature of the sulfonated biopolymer below the glass transition temperature (Tg). In some embodiments, the glass transition temperature of the sulfonated biopolymer can be monitored by differential scanning calorimetry. In some embodiments, the sulfonated biopolymer in acidic form is frozen by exposing the sulfonated biopolymer in acidic form to liquid nitrogen. In some embodiments, this is achieved by placing the sulfonated biopolymer into the liquid nitrogen for about 1 minute. In some embodiments, this results in flash freezing of the sulfonated biopolymer in acidic form. Many polymers which are at temperatures above their Tg have a gummy texture making them difficult to grind into a powder. By freezing the sulfonated biopolymer to below its Tg, the polymer loses its gummy character due to the loss of thermal energy from the polymer strands that confer gummy properties to a polymer. As a result, the grinding sulfonated biopolymer forms cracks at the intramolecular level resulting in the formation of small particles rather than smearing of the sulfonated biopolymer that might occur at temperatures above its Tg.

In some embodiments, the frozen sulfonated biopolymer in acidic form is subjected to mechanical grinding to form a microcrystalline powder. In some embodiments, the sulfonated biopolymer can be milled to form a microcrystalline powder. In some embodiments, a ball mill can be used to obtain a microcrystalline powder. In some embodiments, the frozen sulfonated biopolymer in acidic form is subjected to mechanical grinding to increase its surface area. In some embodiments, an increase in surface area may be ascertained by Brunauer-Emmett-Teller (BET) analysis. In some embodiments, an increase in surface area can be ascertained using an envelope surface area analyzer. In some embodiments, the catalytic performance of the sulfonated biopolymer catalyst is correlated to the surface area of the sulfonated biopolymer catalyst. In some embodiments, the larger the surface area, the higher the catalytic performance of the sulfonated biopolymer catalyst.

In some embodiments, the microcrystalline powder has a high surface area in excess of about 1 meter$^2$/gram. In some embodiments, the purified sulfonated biopolymer in a microcrystalline powder has a polydisperse distribution of molecular weights. In some embodiments, the polydisperse distribution of molecular weights is about 1,000 Daltons to about 140,000 Daltons. In some embodiments, the molecular weight of the purified sulfonated biopolymer can be ascertained by gel permeation chromatography (GPC) or by light-scattering analysis.

In some embodiments, formation of a microcrystalline powder allows the sulfonated biopolymer to incorporate large amounts of hydrophilic molecules. In some embodiments, the sulfonated biopolymer in a microcrystalline powder may incorporate large amounts of water. In some embodiments, the incorporation of water by the sulfonated biopolymer can be determined by exposing a dried sample of sulfonated biopolymer to a humid atmosphere for about 24 hours and measuring the increase in weight of the now water saturated sulfonated biopolymer versus the dry sulfonated biopolymer. In some embodiments, the greater the water contents of the sulfonated biopolymer, the greater the ability of the sulfonated biopolymer to catalyze the hydrolysis of cellulose. In some embodiments, the ability of a sulfonated biopolymer in a microcrystalline powder to incorporate large quantities of hydrophilic molecules is due to an abundance of hydrophilic functional groups present on the biopolymer. In some embodiments, the hydrophilic functional groups include hydroxyl and carboxylic acid functional groups.

In some embodiments, the purified sulfonated biopolymer in a microcrystalline powder provides optimal access by cellulose in solution to the sulfonated groups on the sulfonated biopolymer in a microcrystalline powder. In some embodiments, the optimal access by the cellulose in solution gives rise to a high catalytic performance of the purified sulfonated biopolymer.

In some embodiments, the microcrystalline sulfonated biopolymer is lignin, cellulose, hemicellulose, dextrin, a wood-derived biopolymer, or a combination thereof. In some embodiments, the microcrystalline biopolymer is lignin.

In some embodiments, a sulfonated biopolymer can be synthesized as described above starting with a microcrystalline biopolymer and forming carbocation intermediates followed by sulfonation with bisulfite ions. In some embodiments, a sulfonated biopolymer can be obtained from the paper pulping industry.

In the paper-making industry, lignin may be recovered as a by-product of the cellulose product by two principal wood-pulping processes known as a sulfite process and a Kraft process. In the sulfite process, lignin is solubilized from the cellulosic portion of the wood pulp by direct sulfonation, while the Kraft process is based on an alkaline degradation mechanism causing cleavage of β-aryl ether linkages in the polymeric lignin which sequentially result in chemical functions of the phenolic and carboxylic type. Kraft process lignin generally is isolated by acid precipitation from the black liquor of the pulping process at a pH below the pKa of the phenolic groups.

Some embodiments are directed to a method of extracting a purified sulfonated biopolymer from sulfite wood pulp, the method comprising: precipitating a sulfonated biopolymer from the sulfite wood pulp to form a sulfonated biopolymer salt; filtering and washing the sulfonated biopolymer salt to form a purified sulfonated biopolymer salt; adjusting the pH of the purified sulfonated biopolymer salt to form a purified sulfonated biopolymer in acidic form; freezing the purified sulfonated biopolymer in acidic form in liquid nitrogen; and grinding the purified sulfonated biopolymer in acidic form into a microcrystalline powder.

In some embodiments, the sulfonated biopolymer is dissolved in the sulfite wood pulp. In some embodiments, the sulfonated biopolymer is precipitated as a salt. In some embodiments, the precipitation of the sulfonated biopolymer allows for the separation of the sulfonated biopolymer from the sulfite wood pulp and liquor produced during this process. In some embodiments, the resulting sulfonated biopolymer is a purified sulfonated biopolymer.

In some embodiments, the precipitating step comprises adding a hydroxide solution. In some embodiments, the hydroxide solution is selected from calcium hydroxide, magnesium hydroxide, beryllium hydroxide, strontium hydroxide, radium hydroxide, barium hydroxide, or combinations thereof. In some embodiments, the salt formed corresponds to the type of hydroxide solution used. For example, precipitating the sulfonated biopolymer with calcium hydroxide will yield a sulfonated biopolymer calcium salt.

In some embodiments, once the sulfonated biopolymer is precipitated, the sulfonated biopolymer forms a salt. In some embodiments, the salt formed corresponds to the type of hydroxide solution used. For illustrative purposes, in embodiments where calcium hydroxide is used, the precipitated salt will be a calcium salt. In some embodiments, the sulfonated biopolymer salt is a calcium salt, a magnesium salt, a beryllium salt, a strontium salt, a radium salt, a barium salt, or combinations thereof. In some embodiments, the sulfonated biopolymer salt is a calcium salt.

Some embodiments further comprise adjusting the pH of the purified sulfonated biopolymer salt to form a purified sulfonated biopolymer in acidic form. In some embodiments, the pH of the purified sulfonated biopolymer salt is reduced to a low pH, such as about 0 to about 6. In some embodiments, the pH of the purified sulfonated biopolymer salt is reduced to a pH of about 0-6. In some embodiments, the pH of the sulfonated biopolymer salt is reduced to a pH of about 0. In some embodiments, the pH of the sulfonated biopolymer salt is reduced to a pH of about 1. In some embodiments, the pH of the purified sulfonated biopolymer salt is reduced to a pH of about 2. In some embodiments, the pH of the purified sulfonated biopolymer salt is reduced to a pH of about 3. In some embodiments, the pH of the purified sulfonated biopolymer salt is reduced to a pH of about 4. In some embodiments, the pH of the purified sulfonated biopolymer salt is reduced to a pH of about 5. In some embodiments, the pH of the sulfonated biopolymer salt is reduced to a pH of about 6. In some embodiments, reducing the pH results in formation of a purified sulfonated biopolymer salt in its free acid form. In some embodiments, the free acid form of the purified sulfonated biopolymer salt renders it insoluble in water.

In some embodiments, the step of adjusting the pH of the purified sulfonated biopolymer salt comprises adding a dilute mineral acid. In some embodiments, the dilute mineral acid is hydrochloric acid, nitric acid, phosphoric acid, sulfuric acid, boric acid, hydrofluoric acid, hydrobromic acid, perchloric acid, or combinations thereof.

In some embodiments, the biopolymer salt in the free acid form is washed with fresh water to remove impurities from the sulfite wood pulping process. In some embodiments, the biopolymer salt in the free acid form is filtered.

In some embodiments, the purified sulfonated biopolymer is allowed to air dry. In some embodiments, the purified sulfonated biopolymer is exposed to atmospheric air causing the solvents present to evaporate leaving behind a purified sulfonated biopolymer in solid form. In some embodiments, the purified sulfonated biopolymer is allowed to air dry for a period of time of about 1 to about 12 hours. In some embodiments, the purified sulfonated biopolymer is allowed to air dry for a period of time of about 1 to about 9 hours. In some embodiments, the purified sulfonated biopolymer is allowed to air dry for a period of time of about 1 to about 6 hours. In some embodiments, the purified sulfonated biopolymer is allowed to air dry for a period of time of about 1 to about 3 hours. In some embodiments, the purified sulfonated biopolymer is allowed to air dry at ambient temperature and pressure. In some embodiments, the sulfonated biopolymer can be spread onto an evaporating dish and placed in a drying oven at a temperature of about 30° C. to about 50° C.

In some embodiments, the purified sulfonated biopolymer in acidic form is frozen. In some embodiments, the purified sulfonated biopolymer in acidic form is frozen in liquid nitrogen. In some embodiments, the frozen purified sulfonated biopolymer in acidic form is subjected to mechanical grinding to form a microcrystalline powder. In some embodiments, the frozen purified sulfonated biopolymer in acidic form is subjected to mechanical grinding with a ball mill.

In some embodiments, the steps of freezing the purified sulfonated biopolymer in acidic form in liquid nitrogen and grinding the purified sulfonated biopolymer into a microcrystalline powder result in a significant increase in the surface area of the sulfonated biopolymer. In some embodiments, the larger surface area of the sulfonated biopolymer catalyst may result in greater exposure of the cellulose to the sulfonate groups. In some embodiments, this results in a greater efficiency of the hydrolysis of cellulose in the presence of the sulfonated biopolymer catalyst. In some embodiments, this results in a faster rate of cellulose hydrolysis. In some embodiments, an increase in surface area may be ascertained by Brunauer-Emmett-Teller (BET) analysis. In some embodiments, an increase in surface area can be ascertained using an envelope surface area analyzer.

In some embodiments, NMR analysis of the purified sulfonated biopolymer allows for the determination of the relative equivalents of sulfonate groups, hydroxyl groups and carboxylic acid groups present in a particular batch of purified sulfonated biopolymer.

In some embodiments, the degree of sulfonation can be determined by NMR analysis. Aliquots of the reaction can be taken and measured by $^1$H NMR analysis because the sulfonate chain will not register a proton signal by $^1$H NMR analysis and replace the hydroxyl signal, therefore diminishing signals in the hydroxyl and carboxylic acid regions. In some embodiments, the percentage change in the hydroxyl and carboxylic acid regions is a surrogate for the degree of sulfonate groups present on the purified sulfonated biopolymer. For example, in some embodiments, a 90% decrease in the signal signals in the hydroxyl and carboxylic acid regions is indicative that 90% of the hydroxyl and carboxylic acid side chains have been substituted with sulfonate side chains, leaving 10% of the hydroxyl and carboxylic acid side chains on the purified sulfonated biopolymer.

In yet other embodiments, elemental analysis, $^1$H NMR analysis which is modified to differentiate the carboxylic acid signals from the sulfonic acid protons, or combinations thereof, can be used to determine the degree of sulfonation.

In some embodiments, the microcrystalline powder has a high surface area in excess of about 1 meter$^2$/gram. In yet other embodiments, the purified sulfonated biopolymer has a polydisperse distribution of molecular weights. In some embodiments, the polydisperse distribution of molecular weights is about 1,000 Daltons to about 140,000 Daltons.

In some embodiments, the purified sulfonated biopolymer in acidic form comprises a sulfonated biopolymer with a plurality of pendent acid groups of formula —COOH, a plurality of pendent phenolic alcohol groups of formula —OH, a plurality of pendent sulfonate groups of formula —SO$_2$OH, or combinations thereof.

In some embodiments, the presence of the desired functional groups on the sulfonated biopolymer may be ascertained by scanning electron microscopy, powder X-ray diffraction, Raman spectroscopy, Fourier transform infrared spectroscopy, $^{13}$C cross-polarization (CP) magic angle spinning nuclear magnetic resonance, $^{31}$P MAS NMR, gas adsorption analysis, elemental analysis, cation-exchange analysis, and combinations thereof.

In some embodiments, the purified sulfonated biopolymer is lignin, cellulose, hemicellulose, dextrin, a wood-derived biopolymer, or a combination thereof. In yet other embodiments, the purified sulfonated biopolymer is lignin.

Lignin is a complex, high-molecular weight polymer occurring naturally in close association with cellulose in plants and trees. In the paper-making industry, lignin may be recovered as a by-product of the cellulose product by two principal wood-pulping processes known as a sulfite process and a Kraft process. In the sulfite process, lignin is solubilized from the cellulosic portion of the wood pulp by direct sulfonation, while the Kraft process is based on an alkaline degradation mechanism causing cleavage of β-aryl ether linkages in the polymeric lignin which sequentially result in chemical functions of the phenolic and carboxylic type. Kraft process lignin generally is isolated by acid precipitation from the black liquor of the pulping process at a pH below the pKa of the phenolic groups.

In some embodiments, the purified sulfonated lignin is a lignosulfonate. Lignosulfonates are water-soluble by-products of sulfite pulping. In some embodiments, during the process of sulfite pulping, an acid source cleaves a percentage of the aromatic ether bonds. The acid cleavage of lignin to form carbocation intermediates and their subsequent reaction with bisulfite ions ($HSO_3^-$) to form sulfonated lignin is shown below, wherein R is selected from —H, —OH, —OCH$_3$ and —CH$_3$ or another sulfonated lignin:

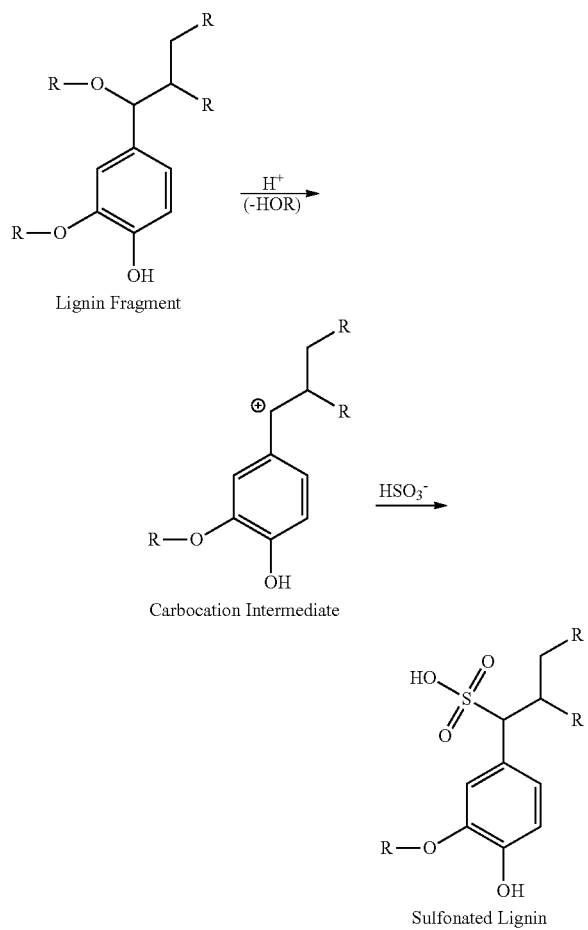

The structures in the reaction scheme shown above are intended to represent, in some embodiments, a complete lignin molecule. In yet other embodiments, the structures in the reaction scheme shown above are intended to represent portions of larger lignin molecules.

In some embodiments, sulfonation occurs solely on the side chains, not on the aromatic rings, due to the nature of the above substitution reaction. In some embodiments, the resulting lignosulfonates can have very polydisperse distributions of molecular weight, of about 1 k to about 140 k Daltons.

In some embodiments, the lignosulfonates produced by this reaction are recovered from the leftover pulping liquid by neutralization with calcium hydroxide, which precipitates the lignosulfonates as their corresponding calcium salts. In some embodiments, filtration, washing/and pH adjustment then yields a pure lignosulfonate in its acidic form. In some embodiments, ion exchange can also be used as a separation technique to obtain a pure lignosulfonate in acidic form.

In some embodiments, the lignosulfonate is dissolved in the sulfite wood pulp. In some embodiments, the sulfonated biopolymer is precipitated as a salt. In some embodiments, the precipitation of the lignosulfonate allows for the separation of the lignosulfonate from the sulfite wood pulp and liquor produced during this process.

In some embodiments, the precipitating step comprises adding a hydroxide solution. In some embodiments, the hydroxide solution is selected from calcium hydroxide, magnesium hydroxide, beryllium hydroxide, strontium hydroxide, radium hydroxide, barium hydroxide, or combinations thereof. In some embodiments, the salt formed corresponds to the type of hydroxide solution used. For example, precipitating the lignosulfonate with calcium hydroxide will yield a lignosulfonate calcium salt.

In some embodiments, once the lignosulfonate is precipitated, the lignosulfonate forms a salt. In some embodiments, the salt formed corresponds to the type of hydroxide solution used. For illustrative purposes, in embodiments where calcium hydroxide is used, the precipitated salt will be a calcium salt. In some embodiments, the lignosulfonate salt is a calcium salt, a magnesium salt, a beryllium salt, a strontium salt, a radium salt, a barium salt, or combinations thereof. In some embodiments, the lignosulfonate salt is a calcium salt.

Some embodiments further comprise adjusting the pH of the lignosulfonate salt to form a purified sulfonated biopolymer in acidic form. In some embodiments, the pH of the lignosulfonate salt is reduced to a low pH, such as about 0 to about 6. In some embodiments, the pH of the lignosulfonate salt is reduced to a pH of about 0-6. In some embodiments, the pH of the sulfonated biopolymer salt is reduced to a pH of about 0. In some embodiments, the pH of the sulfonated biopolymer salt is reduced to a pH of about 1. In some embodiments, the pH of the lignosulfonate salt is reduced to a pH of about 2. In some embodiments, the pH of the lignosulfonate salt is reduced to a pH of about 3. In some embodiments, the pH of the lignosulfonate salt is reduced to a pH of about 4. In some embodiments, the pH of the lignosulfonate salt is reduced to a pH of about 5. In some embodiments, the pH of the sulfonated biopolymer salt is reduced to a pH of about 6. In some embodiments, reducing the pH results in formation of a lignosulfonate salt in its free acid form. In some embodiments, the free acid form of the lignosulfonate salt renders it insoluble in water.

In some embodiments, the step of adjusting the pH of the lignosulfonate salt comprises adding a dilute mineral acid. In some embodiments, the dilute mineral acid is hydrochloric acid, nitric acid, phosphoric acid, sulfuric acid, boric acid, hydrofluoric acid, hydrobromic acid, perchloric acid, or combinations thereof.

In some embodiments, the lignosulfonate salt in the free acid form is washed with fresh water to remove impurities from the sulfite wood pulping process. In some embodiments, the lignosulfonate salt in the free acid form is filtered.

In some embodiments, the lignosulfonate is allowed to air dry. In some embodiments, the lignosulfonate is exposed to atmospheric air causing the solvents present to evaporate leaving behind a purified sulfonated biopolymer in solid form. In some embodiments, the lignosulfonate is allowed to air dry for a period of time of about 1 to about 12 hours. In some embodiments, the lignosulfonate is allowed to air dry for a period of time of about 1 to about 9 hours. In some embodiments, the lignosulfonate is allowed to air dry for a period of time of about 1 to about 6 hours. In some embodiments, the lignosulfonate is allowed to air dry for a period of time of about 1 to about 3 hours. In some embodiments, the lignosulfonate is allowed to air dry at ambient temperature and pressure. In some embodiments, the lignosulfonate can be spread onto an evaporating dish and placed in a drying oven at a temperature of about 30° C. to about 50° C.

In some embodiments, the lignosulfonate in acidic form is frozen. In some embodiments, the lignosulfonate in acidic form is frozen in liquid nitrogen. In some embodiments, this is achieved by placing the sulfonated biopolymer into the vapor phase of the liquid nitrogen for about 1 minute or placing the sulfonated biopolymer into the liquid phase for about 10 seconds. In some embodiments, the frozen lignosulfonate in acidic form is subjected to mechanical grinding to form a microcrystalline powder. In some embodiments, the frozen lignosulfonate in acidic form is subjected to mechanical grinding with a ball mill.

In some embodiments, the steps of freezing the lignosulfonate in acidic form in liquid nitrogen and grinding the lignosulfonate into a microcrystalline powder result in a significant increase in the surface area of the lignosulfonate. In some embodiments, the larger surface area of the lignosulfonate catalyst may result in greater exposure of the cellulose to the sulfonate groups. In some embodiments, this results in a greater efficiency of the hydrolysis of cellulose in the presence of the lignosulfonate catalyst. In some embodiments, this results in a faster rate of cellulose hydrolysis. In some embodiments, an increase in surface area may be ascertained by Brunauer-Emmett-Teller (BET) analysis. In some embodiments, an increase in surface area can be ascertained using an envelope surface area analyzer.

In some embodiments, the lignosulfonate in acidic form comprises a sulfonated biopolymer with a plurality of pendent acid groups of formula —COOH, a plurality of pendent phenolic alcohol groups of formula —OH, a plurality of pendent sulfonate groups of formula —SO$_2$OH, or combinations thereof.

In some embodiments, the presence of the desired functional groups on the lignosulfonate may be ascertained by scanning electron microscopy, powder X-ray diffraction, Raman spectroscopy, Fourier transform infrared spectroscopy, $^{13}$C cross-polarization (CP) magic angle spinning nuclear magnetic resonance, $^{31}$P MAS NMR, gas adsorption analysis, elemental analysis, cation-exchange analysis, and combinations thereof.

In some embodiments, NMR analysis of the lignosulfonate allows for the determination of the relative equivalents of sulfonate groups, hydroxyl groups and carboxylic acid groups present in a particular batch of lignosulfonate.

In some embodiments, the degree of sulfonation can be determined by NMR analysis. Aliquots of the reaction can be taken and measured by $^1$H NMR analysis because the sulfonate chain will not register a proton signal by $^1$H NMR analysis and replace the hydroxyl signal, therefore diminishing signals in the hydroxyl and carboxylic acid regions. In some embodiments, the percentage change in the hydroxyl and carboxylic acid regions is a surrogate for the degree of sulfonate groups present on the lignosulfonate. For example, in some embodiments, a 90% decrease in the signal signals in the hydroxyl and carboxylic acid regions is indicative that 90% of the hydroxyl and carboxylic acid side chains have been substituted with sulfonate side chains, leaving 10% of the hydroxyl and carboxylic acid side chains on the lignosulfonate.

In yet other embodiments, elemental analysis, $^1$H NMR analysis which is modified to differentiate the carboxylic acid signals from the sulfonic acid protons, or combinations thereof, can be used to determine the degree of sulfonation.

In some embodiments, the microcrystalline powder has a high surface area in excess of about 1 meter$^2$/gram. In yet other embodiments, the lignosulfonate has a polydisperse distribution of molecular weights. In some embodiments, the polydisperse distribution of molecular weights is about 1,000 Daltons to about 140,000 Daltons.

Some embodiments are directed to a method of catalyzing the hydrolysis of cellulose. Cellulose is an abundant source of sugars as it is a polymer of glucose linked by β-1,4-glycosidic bonds; cleavage of these bonds releases smaller oligomeric sugar fragments, with complete cleavage yielding glucose monomers. Some embodiments are directed to methods of hydrolyzing pure crystalline cellulose in the presence of a solid-state catalyst. In some embodiments, the solid-state catalyst comprises a biopolymer catalyst. In some embodiments, the solid-state catalyst comprises a sulfonated biopolymer. In some embodiments, sulfonated biopolymer comprises a microcrystalline sulfonated biopolymer comprising a plurality of pendent acid groups of formula —COOH, a plurality of pendent phenolic alcohol groups of formula —OH, and a plurality of pendent sulfonated groups of formula —SO$_2$OH. In some embodiments, the solid-state catalyst is sulfonated lignin.

In some embodiments, the method of catalyzing the hydrolysis of cellulose comprises the steps of: combining microcrystalline cellulose with a biopolymer catalyst in a reaction vessel; heating the reaction vessel; allowing a reaction between the microcrystalline cellulose and the biopolymer catalyst to occur; and quenching the reaction to precipitate the biopolymer catalyst to form a liquid phase comprising hydrolyzed cellulose. In some embodiments, the hydrolyzed cellulose comprises glucose, glucose oligomers, or combinations thereof.

In some embodiments, the biopolymer catalyst is present in excess. In some embodiments, the biopolymer catalyst is not degraded during the cellulose hydrolysis process. In some embodiments, the sulfonated biopolymer is modified during its synthesis such that it is not subject to hydrolysis during the reaction. In some embodiments, the catalyst is not broken down into smaller fragments so as to contaminate the glucose produced from the hydrolysis of cellulose.

In some embodiments, the sulfonated biopolymer catalyst is combined with cellulose in a reaction vessel. In some embodiments, the reaction vessel is a Pyrex test tube reactor. In some embodiments, the cellulose is pure crystalline cellulose. In some embodiments, the sulfonated biopolymer is combined with the cellulose at a ratio of about 1 to 1 to about 1 to 100. In some embodiments, the sulfonated biopolymer is combined with the cellulose at a ratio of about 1 to 1 to about 1 to 10. In some embodiments, the sulfonated biopolymer is combined with the cellulose at a ratio of about 1 to 1 to about 1 to 20. In some embodiments, the sulfonated biopolymer is combined with the cellulose at a ratio of about 1 to 1 to about 1 to 30. In some embodiments, the sulfonated biopolymer is combined with the cellulose at a ratio of about 1 to 1 to about 1 to 40. In some embodiments, the sulfonated biopolymer is combined with the cellulose at a ratio of about 1 to 1 to about 1 to 50. In some embodiments, the sulfonated biopolymer is combined with the cellulose at a ratio of about 1 to 1 to about 1 to 60. In some embodiments, the sulfonated biopolymer is combined with the cellulose at a ratio of about 1 to 1 to about 1 to 70. In some embodiments, the sulfonated biopolymer is combined with the cellulose at a ratio of about 1 to 1 to about 1 to 80. In some embodiments, the sulfonated biopolymer is combined with the cellulose at a ratio of about 1 to 1 to about 1 to 90. In some embodiments, the sulfonated biopolymer is combined with the cellulose at a ratio of about 1 to 10 to about 1 to 20. In some embodiments, the sulfonated biopolymer is combined with the cellulose at a ratio of about 1 to 20 to about 1 to 30. In some embodiments, the sulfonated biopolymer is combined with the cellulose at a ratio of about 1 to 30 to about 1 to 40. In some embodiments, the sulfonated biopolymer is combined with the cellulose at a ratio of about 1 to 40 to about 1 to 50. In some embodiments, the sulfonated biopolymer is combined with the cellulose at a ratio of about 1 to 50 to about 1 to 60. In some embodiments, the sulfonated biopolymer is combined with the cellulose at a ratio of about 1 to 60 to about 1 to 70. In some embodiments, the sulfonated biopolymer is combined with the cellulose at a ratio of about 1 to 70 to about 1 to 80. In some embodiments, the sulfonated biopolymer is combined with the cellulose at a ratio of about 1 to 80 to about 1 to 90. In some embodiments, the sulfonated biopolymer is combined with the cellulose at a ratio of about 1 to 90 to about 1 to 100. In some embodiments, the sulfonated biopolymer is combined with the cellulose at a ratio of about 1 to 10.

In some embodiments, water is added to the reaction vessel. In some embodiments, only enough water to ensure the solubility of the reaction components is required as the reaction is likely to proceed faster when the reactants are more concentrated. In some embodiments, the reaction vessel is sealed prior to the heating step. In some embodiments, the heating step comprises raising the internal temperature of the reaction vessel to a temperature sufficient to allow a hydrolysis of cellulose to proceed. In some embodiments, raising the internal temperature of the reaction vessel is achieved by direct application of heat to the reaction vessel, using, for example, a Bunsen burner. In some embodiments, the reaction vessel is placed in a water bath, wherein the temperature of the water bath is raised to achieve the desired temperature in the reaction vessel.

In some embodiments, the heating step further comprises raising the internal temperature of the reaction vessel to a temperature of about 0° C. to about 120° C. In some embodiments, the heating step further comprises raising the internal temperature of the reaction vessel to a temperature of about 0° C. to about 10° C., about 0° C. to about 20° C., about 0° C. to about 30° C., about 0° C. to about 40° C., about 0° C. to about 50° C., or about 0° C. to about 60° C. In some embodiments, the heating step further comprises raising the internal temperature of the reaction vessel to about 70° C. In some embodiments, the heating step further comprises raising the internal temperature of the reaction vessel to a temperature of about 0° C. to about 80° C., about 0° C. to about 90° C., about 0° C. to about 100° C., about 0° C. to about 110° C., about 0° C. to about 120° C. In some embodiments, the heating step further comprises raising the internal temperature of the reaction vessel to a temperature of about 10° C. to about 20° C., about 20° C. to about 30° C., about 30° C. to about 40° C., about 40° C. to about 50° C., about 50° C. to about 60° C., about 60° C. to about 70° C., about 70° C. to about 80° C., about 80° C. to about 90° C., about 90° C. to about 100° C., about 100° C. to about 110° C., or about 110° C. to about 120° C. In some embodiments, the heating step further comprises incubating the reaction for a period of time sufficient to allow for the hydrolysis of cellulose.

In some embodiments, the heating step further comprises incubating the reaction for about 2 hours to about 6 hours. In some embodiments, the heating step further comprises incubating the reaction for about 2 hours. In some embodiments, the heating step further comprises incubating the reaction for about 3 hours. In some embodiments, the heating step further comprises incubating the reaction for about 4 hours. In some embodiments, the heating step further comprises incubating the reaction for about 5 hours. In some embodiments, the heating step further comprises incubating the reaction for about 6 hours.

In some embodiments, progression of the hydrolysis of cellulose can be monitored by removing samples from the reaction vessel and determining the cellulose, glucose oligomer and glucose content of the reaction. In some embodiments, the more glucose is present the more complete the hydrolysis of cellulose. By way of example, a sample containing only glucose will indicate that the hydrolysis of cellulose is complete. In contrast, a sample containing both cellulose and glucose oligomers indicates that the hydrolysis is not yet complete. In some embodiments, the amounts of glucose, glucose oligomers such as short-chain β-1,4 glucans including cellobiose-cellotetraose can be readily estimated by liquid chromatography (LC). In some embodiments, the presence of water soluble β-1,4 glucans longer than cellopentose-cellohexose can be detected by gel permeation chromatography (GPC) and MALDI TOF mass spectrometry. In some embodiments, yields of glucose and water-soluble β-1,4 glucans can be obtained by LC and the enzymatic hydrolysis of water-soluble β-1,4 glucan using cellulase. In some embodiments, during or after hydrolysis, a sample may be washed with distilled water to form a suspension. In some embodiments, the suspension may be stirred vigorously followed by centrifugation to collect the solid and the supernatant solution. In some embodiments, the amount of glucose in the collected supernatant solution may be estimated by LC. In some embodiments, crude cellulase may be added to the collected supernatant solution, followed by warming in order to hydrolyze polysaccharides such as water-soluble β-1,4 glucans in the solution into monosaccharides such as glucose for 48 h at about 100° C. In some embodiments, the subsequent glucose produced by the hydrolysis of water-soluble β-1,4 glucan was also analyzed by LC. In some embodiments, cellulose conversion as well as glucose and β-1,4 glucan yields may be obtained by using the following equations: cellulose conversion (%))100 (B+C)/A; glucose yield (%))100B/A; total β-1,4 glucan (%))100C/A, wherein A: is the total amount (mol) of glucose monomer in cellulose; B is the amount (mol) of glucose produced by acid-catalyzed hydrolysis and C is the total amount (mol) of glucose monomer in water-soluble β-1,4glucan produced by acid-catalyzed hydrolysis.

Some embodiments further comprise adding water to the reaction vessel during the heating step. In some embodiments, only enough water to ensure the solubility of the reaction components is required as the reaction is likely to proceed faster when the reactants are more concentrated. In some embodiments, the addition of water enhances the catalytic activity of the biopolymer catalyst. In some embodiments, the addition of water to the reaction mixture results in the catalytic activity of the biopolymer catalyst to be about the same catalytic activity as sulfuric acid. Sulfuric acid is a commonly used catalyst in the hydrolysis of cellulose. In some embodiments, the presence of water in the reaction vessel will result in hydration of the sulfonate groups on the biopolymer catalyst.

In some embodiments, once the hydrolysis of cellulose has reached a desired yield of glucose, glucose oligomers, or a combination thereof, the reaction can be stopped by cooling the reaction vessel. Some embodiments further comprise cooling the reaction vessel to ambient temperature after incubating the reaction vessel. In some embodiments, cooling the reaction vessel is accomplished by removing the heat source used to heat the reaction vessel. In yet other embodiments, the temperature of the water bath is lowered to ambient temperature. In some embodiments, the reaction vessel is removed from the water bath and allowed to cool in the ambient air. In some embodiments, the reaction is cooled once a desired yield of hydrolysis products is achieved. In some embodiments, the reaction vessel is frozen to halt the progression of the reaction. In yet other embodiments, the reaction vessel is cooled to ambient temperature thereby slowing down the progression of the reaction. In some embodiments, the reaction is halted at ambient temperature. In yet other embodiments, there is no appreciable reactivity at ambient temperature. In some embodiments, cooling the reaction vessel to ambient temperature results in quenching of the reaction. In some embodiments, quenching the reaction results in cessation of the hydrolysis of cellulose.

In some embodiments, once the hydrolysis of cellulose has reached a desired yield of glucose, glucose oligomers, or a combination thereof, and the reaction is quenched by cooling it to ambient temperature, the products of the reaction may be separated from the modified biopolymer catalyst. In some embodiments, the reaction may be quenched by precipitation of the modified biopolymer catalyst. In some embodiments, the modified biopolymer catalyst is precipitated to form a precipitated modified biopolymer catalyst phase and a liquid phase containing the products of cellulose hydrolysis. In some embodiments, the modified biopolymer catalyst is precipitated by the addition of a barium salt, making the modified biopolymer catalyst insoluble. In some embodiments, the modified biopolymer catalyst is precipitated by the addition of a strontium salt, making the modified biopolymer catalyst insoluble. In some embodiments, the modified biopolymer catalyst is precipitated by the addition of a calcium salt, making the modified biopolymer catalyst insoluble. In some embodiments, the step of separating the liquid phase from the precipitated modified biopolymer catalyst comprises passing the contents of the reaction vessel through a filter to separate the precipitated modified biopolymer catalyst from the liquid phase.

In some embodiments, the step of separating the liquid phase from the precipitated modified biopolymer catalyst comprises centrifuging the contents of the reactor to separate the precipitated modified biopolymer catalyst from the liquid phase. In some embodiments, the liquid phase comprises the products of the reaction. In some embodiments, the products of the reaction comprise the products of the hydrolysis of cellulose. In some embodiments, the products of the hydrolysis of cellulose comprise glucose monomers, glucose oligomers, or a combination thereof. In some embodiments, an example of a glucose oligomer is cellobiose or short chain β-1,4-glucans such as cellobiose-cellotetraose.

In some embodiments, the precipitated modified biopolymer catalyst can be reused in further hydrolysis reactions. In some embodiments, the precipitated modified biopolymer catalyst is dispersed in fresh water. In some embodiments, the pH of the modified biopolymer catalyst dispersed in fresh water may be adjusted with a mineral acid. In some embodiments, the pH is adjusted to a pH of about 0 to about 6.

In some embodiments, the mineral acid is selected from hydrochloric acid, nitric acid, phosphoric acid, sulfuric acid, boric acid, hydrofluoric acid, hydrobromic acid, and perchloric acid.

In some embodiments, the modified biopolymer catalyst used to catalyze the hydrolysis of cellulose comprises: a microcrystalline sulfonated biopolymer comprising a plurality of pendent acid groups of formula —COOH, a plurality of pendent phenolic alcohol groups of formula —OH, and a plurality of pendent sulfonated groups of formula —$SO_2OH$. In some embodiments, the sulfonated biopolymer is sulfonated lignin, sulfonated cellulose, sulfonated hemicellulose, sulfonated dextrin, a sulfonated wood-derived biopolymer, or a combination thereof. In some embodiments, the biopolymer is sulfonated lignin.

In some embodiments, a sulfonated biopolymer catalyst can also be used in the hydrolysis of other carbohydrate polymers and oligomers that are linked by similar bonds as those linking glucose monomers in cellulose. In some embodiments, a sulfonated biopolymer catalyst can also be used in the hydrolysis of polysaccharides held together by glycosidic bonds.

EXAMPLES

Example 1

Extraction of Sulfonated Lignin from the Wood Pulping Process

Lignosulfonates are water-soluble by-products of sulfite pulping, a treatment step during the production of paper. During the process of sulfite pulping, an acid source cleaves a percentage of the aromatic ether bonds to form lignin fragments. The acid cleavage of lignin to form carbocation intermediates and their subsequent reaction with bisulfite ions ($HSO_3^-$) to form sulfonated lignin is shown below wherein R is selected from —H, —OH, and —$CH_3$ or another sulfonated lignin subunit:

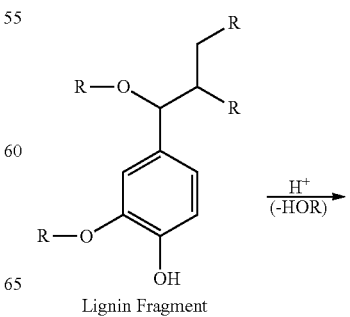

Lignin Fragment

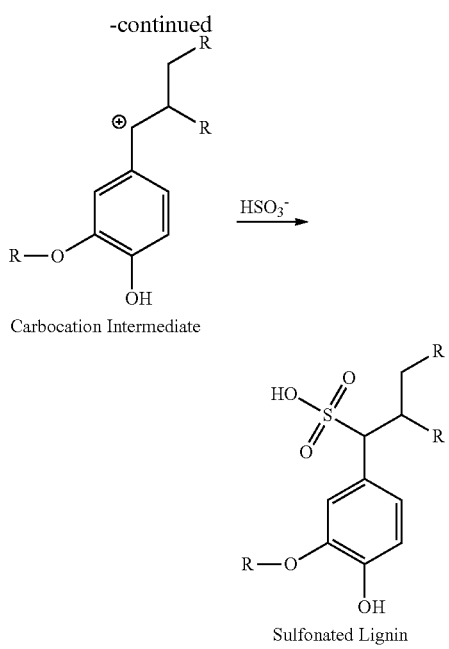

Carbocation Intermediate

Sulfonated Lignin

The sulfonation of lignin in the reaction scheme above occurs solely on the side chains, not on the aromatic rings, due to the nature of the substitution reaction.

The lignosulfonates produced by this reaction are recovered from the pulping liquid by neutralization with calcium hydroxide, which precipitates the lignosulfonates as their corresponding calcium salts. The pH of the lignosulfonates is then lowered to a pH of about 2 to about 5 to form the free acid form of the lignosulfonate calcium salt. This is followed by filtration, washing, freezing and mechanical grinding to form a microcrystalline powder.

The lignosulfonate in the free acid form is insoluble in water. This permits washing the lignosulfonate in the free acid to be washed with fresh water to remove impurities remaining from the wood pulping process.

Adjusting the pH of the lignosulfonate salt comprises adding a dilute hydrochloric acid to lower the pH to about 0 to about 6 to yield pure lignosulfonate in its free acid form. In its free acid form, the pure lignosulfonate is insoluble in water. As a result, the lignosulfonate can be washed and filtered with fresh water to remove impurities from the sulfite pulping process and precipitation step.

NMR analysis of the lignosulfonate allows for the determination of the relative equivalents of sulfonate groups, hydroxyl groups and carboxylic acid groups present in a particular batch of lignosulfonate. The degree of sulfonation can be determined by NMR analysis. Aliquots of the reaction can be taken and measured by $^1$H NMR analysis because the sulfonate chain will not register a proton signal by $^1$H NMR analysis and replace the hydroxyl signal, therefore diminishing signals in the hydroxyl and carboxylic acid regions. The percentage change in the hydroxyl and carboxylic acid regions is a surrogate for the degree of sulfonate groups present on the lignosulfonate. For example, in some embodiments, a 90% decrease in the signal signals in the hydroxyl and carboxylic acid regions is indicative that 90% of the hydroxyl and carboxylic acid side chains have been substituted with sulfonate side chains, leaving 10% of the hydroxyl and carboxylic acid side chains on the lignosulfonate.

Alternatively, the determination of the relative equivalents of sulfonate groups, hydroxyl groups and carboxylic acid groups present in a particular batch of lignosulfonate by elemental analysis, $^1$H NMR analysis which is modified to differentiate the carboxylic acid signals from the sulfonic acid protons, or combinations thereof, can be used to determine the degree of sulfonation.

The lignosulfonate in acidic form is then air dried to form a powder and evaporate any solvents and then frozen in liquid nitrogen. This is achieved by placing the sulfonated biopolymer into the vapor phase of the liquid nitrogen for about 1 minute or placing the sulfonated biopolymer into the liquid phase for about 10 seconds. The frozen lignosulfonate is subsequently subjected to mechanical grinding with a ball mill to form a microcrystalline powder resulting in a significant increase in the surface area of the sulfonated biopolymer. The increase in surface area may be ascertained by Brunauer-Emmett-Teller (BET) analysis or using an envelope surface area analyzer.

The resulting purified lignosulfonate powder is expected to have a polydisperse distribution of molecular weights ranging from about 1,000 Daltons to about 140,000 Daltons.

To ensure that lignosulfonates comprise the desired combination of —COOH, —OH, and —SO$_2$OH groups, the presence of the desired functional groups on the lignosulfonate may be ascertained by scanning electron microscopy, powder X-ray diffraction, Raman spectroscopy, Fourier transform infrared spectroscopy, $^{13}$C cross-polarization (CP) magic angle spinning nuclear magnetic resonance, $^{31}$P MAS NMR, gas adsorption analysis, elemental analysis, cation-exchange analysis, and combinations thereof.

Example 2

Synthesis of a Sulfonated Biopolymer Catalyst

The synthesis of a microcrystalline biopolymer catalyst is a multistep process consisting of sulfonating a biopolymer to form a sulfonated biopolymer, freezing the sulfonated biopolymer, and grinding the sulfonated biopolymer into a microcrystalline powder to form a microcrystalline biopolymer catalyst.

Suitable biopolymers include but are not limited to lignin, cellulose, hemicellulose, dextrin, a wood-derived biopolymer, or a combination thereof.

The first step in the synthesis of a microcrystalline sulfonated biopolymer catalyst involves treating the biopolymer with sulfurous acid at a temperature of 20° C. to form a carbocation intermediate, followed by treating the carbocation intermediate with bisulfite ions to form a sulfonated biopolymer. The temperature is maintained at 20° C. for the duration of this step.

The second step involves precipitating the sulfonated biopolymer as a salt. The precipitating step comprises adding calcium hydroxide solution to form a sulfonated biopolymer calcium salt. At this point in the reaction the pH is about 9.5 to about 10.

The third step in the synthesis involves adjusting the pH of the sulfonated biopolymer calcium salt to form a sulfonated biopolymer in acidic form. The pH is adjusted by adding a small amount of dilute hydrochloric acid to lower the pH to about 0 to about 6 to form the sulfonated biopolymer calcium salt in its free acid form. This renders the sulfonated biopolymer insoluble in water and allows for it to be washed in fresh water to remove impurities from the sulfonation reaction and precipitation.

After the pH is adjusted, the presence of the desired functional groups on the sulfonated biopolymer may be ascertained by scanning electron microscopy, powder X-ray diffraction, Raman spectroscopy, Fourier transform infrared spectroscopy, $^{13}$C cross-polarization (CP) magic angle spinning nuclear magnetic resonance, $^{31}$P MAS NMR, gas adsorption analysis, elemental analysis, or cation-exchange analysis.

NMR analysis of the sulfonated biopolymer allows for the determination of the relative equivalents of sulfonate groups, hydroxyl groups and carboxylic acid groups present in a particular batch of sulfonated biopolymer. The degree of sulfonation can be determined by NMR analysis. Aliquots of the reaction can be taken and measured by $^1$H NMR analysis because the sulfonate chain will not register a proton signal by $^1$H NMR analysis and replace the hydroxyl signal, therefore diminishing signals in the hydroxyl and carboxylic acid regions. The percentage change in the hydroxyl and carboxylic acid regions is a surrogate for the degree of sulfonate groups present on the sulfonated biopolymer. For example, in some embodiments, a 90% decrease in the signal signals in the hydroxyl and carboxylic acid regions is indicative that 90% of the hydroxyl and carboxylic acid side chains have been substituted with sulfonate side chains, leaving 10% of the hydroxyl and carboxylic acid side chains on the sulfonated biopolymer.

The fourth step involves filtering, washing the sulfonated biopolymer in fresh water to remove impurities and leftover reactants and air-drying the sulfonated biopolymer to evaporate off any remaining solvents for about 12 hours at ambient temperature and pressure to form a powder. This is followed by freezing the sulfonated biopolymer in acidic form and frozen in liquid nitrogen. This is achieved by placing the sulfonated biopolymer into the liquid phase of the liquid nitrogen for about 1 minute to about 2 minutes.

The frozen sulfonated biopolymer is then subjected to mechanical grinding using a ball mill to form a microcrystalline powder. The result of forming a microcrystalline powder is to significantly increase the surface area of the sulfonated biopolymer. The increase in surface area may be ascertained by Brunauer-Emmett-Teller (BET) analysis or with an envelope surface area analyzer.

The microcrystalline powder is expected to have a surface area in excess of about 1 meter$^2$/gram and a polydisperse distribution of molecular weights from about 1,000 Daltons to about 140,000 Daltons.

Example 3

Synthesis of a Sulfonated Lignin Catalyst

The synthesis of a microcrystalline sulfonated lignin catalyst is a multistep process consisting of sulfonating lignin to form sulfonated lignin, freezing the sulfonated lignin, and grinding the sulfonated lignin into a microcrystalline powder to form a microcrystalline sulfonated lignin catalyst.

The first step in the synthesis of a microcrystalline sulfonated lignin catalyst involves treating the lignin with sulfurous acid at a temperature of 20° C. to form a carbocation intermediate, followed by treating the carbocation intermediate with bisulfite ions to form a sulfonated lignin. The temperature is maintained at 20° C. for the duration of this step.

The second step involves precipitating the sulfonated lignin as a salt. The precipitating step comprises adding calcium hydroxide solution to form a sulfonated lignin calcium salt. At this point in the reaction the pH is about 9.5 to about 10.

The third step in the synthesis involves adjusting the pH of the sulfonated lignin calcium salt to form a sulfonated lignin in acidic form. The pH is adjusted by adding a small amount of dilute hydrochloric acid to lower the pH to about 0 to about 6 to form the sulfonated lignin calcium salt in its free acid form. This renders the sulfonated lignin insoluble in water and allows for it to be washed in fresh water to remove impurities from the sulfonation reaction and precipitation.

After the pH is adjusted, the presence of the desired functional groups on the sulfonated lignin may be ascertained by scanning electron microscopy, powder X-ray diffraction, Raman spectroscopy, Fourier transform infrared spectroscopy, $^{13}$C cross-polarization (CP) magic angle spinning nuclear magnetic resonance, $^{31}$P MAS NMR, gas adsorption analysis, elemental analysis, or cation-exchange analysis.

The fourth step involves filtering, washing the sulfonated lignin in fresh water to remove impurities and leftover reactants and air-drying the sulfonated lignin to evaporate off any remaining solvents and forming a powder. This is followed by freezing the sulfonated lignin in acidic form and frozen in liquid nitrogen. This is achieved by placing the sulfonated biopolymer into the vapor phase of the liquid nitrogen for about 1 minute or placing the sulfonated biopolymer into the liquid phase for about 10 seconds.

The frozen sulfonated lignin is then subjected to mechanical grinding using a ball mill to form a microcrystalline powder. The result of forming a microcrystalline powder is to significantly increase the surface area of the sulfonated lignin. The increase in surface area may be ascertained by Brunauer-Emmett-Teller (BET) analysis or with an envelope surface area analyzer.

The microcrystalline powder is expected to have a surface area in excess of about 1 meter$^2$/gram and a polydisperse distribution of molecular weights of about 1,000 Daltons to about 140,000 Daltons.

Example 4

Catalysis of the Hydrolysis of Cellulose with a Sulfonated Lignin Catalyst Support Lignosulfonates are purified from the sulfite wood-pulping process as described above in Example 1. A mixture of 0.25 grams of cellulose with an average particle size of 20-100 μm; 80% crystallinity, and a degree of polymerization of 200-300, are placed along with the finely ground lignosulfonate (10 weight % loading, or 0.025 grams) along with 5 to 10 ml of water into a Pyrex test tube reactor.

The reactor is then sealed with a Swagelok tube fitting to give a total reactor volume of 35 cm$^3$. The tube is placed in a boiling water bath to raise the temperature of the reactor to about 80° C. Suitable reaction times can be determined by aliquot analysis by LC and/or GPC, which will detect not only glucose but also any small amounts of short chain β-1,4-glucans such as cellobiose-cellotetraose.

Once the reaction is complete after approximately 2-4 hours, the reaction is cooled to ambient temperature and quenched with a few drops of concentrated CaCl$_2$ solution. This precipitates the lignosulfonate as a calcium salt and halts the reaction. The precipitated lignosulfonate can be removed by filtration; the resulting liquid phase contains the hydrolyzed cellulose in the form of glucose.

The filtered mass of calcium lignosulfonate can be dispersed in fresh water, pH adjusted with a mineral acid to a pH of about 0 to about 6 to form the free acid, and filtered or centrifuged to allow isolation of the active catalyst. The lignosulfonate does not need to be re-frozen in liquid nitrogen or subject to grinding and will be fully regenerated and ready for use in another batch of cellulose hydrolysis.

The products of the reaction can be detected by several methods. The presence of water-soluble β-1,4 glucans longer than cellopentose-cellohexose can be detected by gel permeation chromatography (GPC) and MALDI TOF mass spectrometry. The yields of glucose and water-soluble β-1,4 glucans can be obtained by LC and the enzymatic hydrolysis of water-soluble β-1,4 glucan using cellulase. During or after hydrolysis, a sample may be washed several times with distilled water to form a suspension. In some embodiments, the suspension may be stirred vigorously for about 30 minutes followed by centrifugation to collect the solid and the supernatant solution. In some embodiments, the amount of glucose in the collected supernatant solution may be estimated by LC. In some embodiments, crude cellulose may be added to the collected supernatant solution, followed by warming in order to hydrolyze polysaccharides such as water-soluble β-1,4 glucans in the solution into monosaccharides such as glucose for 48 h at about 100° C. In some embodiments, the subsequent glucose produced by the hydrolysis of water-soluble β-1,4 glucan was also analyzed by LC. In some embodiments, cellulose conversion as well as glucose and β-1,4 glucan yields may be obtained by using the following equations: cellulose conversion (%))100(B+C)/A; glucose yield (%))100B/A; total β-1,4 glucan (%)) 100C/A, wherein A: is the total amount (mol) of glucose monomer in cellulose; B is the amount (mol) of glucose produced by acid-catalyzed hydrolysis and C is the total amount (mol) of glucose monomer in water-soluble β-1, 4glucan produced by acid-catalyzed hydrolysis.

In the present disclosure, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the Figure, can be arranged, substituted, combined, separated, and designed in a wide variety of different configurations, all of which are explicitly contemplated herein.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art, all language such as "up to," "at least," and "the like" include the number recited and refer to ranges, which can be subsequently broken down into subranges as discussed above. Finally, as will be understood by one skilled in the art, a range includes each individual member. Thus, for example, a group having 1-3 substituents refers to groups having 1, 2, or 3 substituents. Similarly, a group having 1-5 substituents refers to groups having 1, 2, 3, 4, or 5 substituents, and so forth.

What is claimed is:

1. A method of synthesizing a microcrystalline biopolymer catalyst, the method comprising:
    sulfonating a biopolymer to form a sulfonated biopolymer, wherein the biopolymer is selected from the group consisting of cellulose; hemicellulose; dextrin; and a combination thereof;
    freezing the sulfonated biopolymer in liquid nitrogen; and
    grinding the sulfonated biopolymer into a microcrystalline powder to form a microcrystalline biopolymer catalyst.

2. The method of claim 1, wherein the grinding comprises grinding the sulfonated biopolymer to yield a microcrystalline powder having a high surface area in excess of about 1 meter$^2$/gram and a polydisperse distribution of molecular weights of about 1,000 Daltons to about 140,000 Daltons.

3. The method of claim 1, wherein sulfonating the biopolymer comprises:
    treating the biopolymer with an acid to form a carbocation intermediate; and
    treating the carbocation intermediate with bisulfate ions to form a sulfonated biopolymer.

4. The method of claim 3, wherein treating the biopolymer with the acid comprises treating with sulfurous acid.

5. The method of claim 3, further comprising precipitating the sulfonated biopolymer as a salt.

6. The method of claim 5, wherein precipitating the sulfonated biopolymer comprises adding at least one hydroxide solution selected from calcium hydroxide, magnesium hydroxide, beryllium hydroxide, strontium hydroxide, radium hydroxide, barium hydroxide, or combinations thereof.

7. The method of claim 5, further comprising:
    filtering the sulfonated biopolymer salt;
    washing the filtered sulfonated biopolymer salt; and
    air-drying the sulfonated biopolymer salt.

8. The method of claim 5, further comprising adjusting the pH of the sulfonated biopolymer salt to form an acidic sulfonated biopolymer.

9. The method of claim 8, wherein adjusting the pH yields the acidic sulfonated biopolymer that comprises a sulfonated biopolymer with a plurality of pendent acid groups of formula —COOH, a plurality of pendent phenolic alcohol groups of formula —OH, a plurality of pendent sulfonate groups of formula —SO$_2$OH, or combinations thereof.

10. The method of claim 8, wherein adjusting the pH of the sulfonated biopolymer salt comprises adding a dilute mineral acid.

11. The method of claim 10, wherein adding the dilute mineral acid comprises adding hydrochloric acid, nitric acid, phosphoric acid, sulfuric acid, boric acid, hydrofluoric acid, hydrobromic acid, perchloric acid, or combinations thereof.

12. A method of extracting a purified sulfonated biopolymer from sulfite wood pulp, the method comprising:
    precipitating a sulfonated biopolymer from the sulfite wood pulp to form a sulfonated biopolymer salt, wherein the biopolymer is selected from the group consisting of cellulose; hemicellulose; dextrin; and a combination thereof;
    filtering and washing the sulfonated biopolymer salt to form a purified sulfonated biopolymer salt;
    adjusting the pH of the purified sulfonated biopolymer salt to form a purified sulfonated biopolymer in acidic form;
    freezing the purified sulfonated biopolymer in acidic form in liquid nitrogen; and
    grinding the purified sulfonated biopolymer in acidic form into a microcrystalline powder.

13. The method of claim 12, wherein adjusting the pH of the sulfonated biopolymer salt comprises adding a dilute mineral acid that is hydrochloric acid, nitric acid, phosphoric acid, sulfuric acid, boric acid, hydrofluoric acid, hydrobromic acid, perchloric acid, or combinations thereof.

14. The method of claim 12, wherein the grinding step comprises grinding the purified sulfonated biopolymer to yield a microcrystalline powder that has a high surface area in excess of about 1 meter$^2$/gram; and
    a polydisperse distribution of molecular weights of about 1,000 Daltons to about 140,000 Daltons.

15. The method of claim 12, wherein precipitating the sulfonated biopolymer comprises adding a hydroxide solution.

16. The method of claim 15, wherein the precipitating step comprises adding a hydroxide solution selected from calcium hydroxide, magnesium hydroxide, beryllium hydroxide, strontium hydroxide, radium hydroxide, barium hydroxide, and combinations thereof.

17. The method of claim 15, wherein the precipitating step comprises precipitating the sulfonated biopolymer with a plurality of pendent acid groups of formula —COOH, a plurality of pendent phenolic alcohol groups of formula —OH, a plurality of pendent sulfonate groups of formula —SO$_2$OH, or combinations thereof.

* * * * *

UNITED STATES PATENT AND TRADEMARK OFFICE
CERTIFICATE OF CORRECTION

Page 1 of 1

PATENT NO. : 9,598,452 B2
APPLICATION NO. : 14/394827
DATED : March 21, 2017
INVENTOR(S) : Brizius It is certified that error appears in the above-identified patent and that said Letters Patent is hereby corrected as shown below:

In the Specification

In Column 1, Line 7, delete "§371" and insert -- § 371 --, therefor.

In Column 2, Line 56, delete "biopolymer," and insert -- biopolymer; --, therefor.

In Column 22, Line 40, delete "biopolymer," and insert -- biopolymer; --, therefor.

In Column 22, Line 41, delete "biopolymer," and insert -- biopolymer; --, therefor.

In the Claims

In Column 27, Line 37, in Claim 3, delete "bisulfate" and insert -- bisulfite --, therefor.

Signed and Sealed this
First Day of August, 2017

Joseph Matal
*Performing the Functions and Duties of the*
*Under Secretary of Commerce for Intellectual Property and*
*Director of the United States Patent and Trademark Office*